US010043009B2

(12) United States Patent
Upchurch (10) Patent No.: US 10,043,009 B2
(45) Date of Patent: Aug. 7, 2018

(54) TECHNOLOGIES FOR SOFTWARE BASIC BLOCK SIMILARITY ANALYSIS

(71) Applicant: Intel Corporation, Santa Clara, CA (US)

(72) Inventor: Jason R. Upchurch, Monument, CO (US)

(73) Assignee: Intel Corporation, Santa Clara, CA (US)

( * ) Notice: Subject to any disclaimer, the term of this patent is extended or adjusted under 35 U.S.C. 154(b) by 695 days.

(21) Appl. No.: 14/494,751

(22) Filed: Sep. 24, 2014

(65) Prior Publication Data

US 2017/0300691 A1   Oct. 19, 2017

(51) Int. Cl.
| | |
|---|---|
| *G06F 21/56* | (2013.01) |
| *G06F 21/57* | (2013.01) |
| *G06F 17/30* | (2006.01) |
| *G06F 21/12* | (2013.01) |

(52) U.S. Cl.
CPC ...... *G06F 21/563* (2013.01); *G06F 17/30713* (2013.01); *G06F 21/12* (2013.01); *G06F 21/577* (2013.01); *G06F 2221/033* (2013.01)

(58) Field of Classification Search
CPC ..................................................... G06F 21/12
USPC ........................................................ 726/24
See application file for complete search history.

(56) References Cited

U.S. PATENT DOCUMENTS

| | | | | |
|---|---|---|---|---|
| 5,774,588 A | * | 6/1998 | Li ........................ | G06F 17/273 382/229 |
| 8,239,948 B1 | * | 8/2012 | Griffin ................ | H04L 63/1416 726/22 |
| 8,375,450 B1 | * | 2/2013 | Oliver ..................... | G06F 21/56 713/181 |
| 9,185,119 B1 | * | 11/2015 | Tamersoy ............... | H04L 63/14 |
| 2006/0184556 A1 | * | 8/2006 | Tan .................... | G06F 17/30949 |
| 2012/0284691 A1 | * | 11/2012 | Aljammaz ................ | G06F 9/44 717/120 |

OTHER PUBLICATIONS

Bruschi et al., Using Code Normalization for Fighting Self-Mutating Malware, 2006, Proceedings fo the International Symposium of Secure Software Engineering, pp. 37-44.*

* cited by examiner

*Primary Examiner* — Hadi S Armouche
*Assistant Examiner* — Khalil Naghdali
(74) *Attorney, Agent, or Firm* — Barnes & Thornburg LLP (57) ABSTRACT

Technologies for analyzing software similarity include a computing device having access to a collection of sample software. The computing device identifies a number of code segments, such as basic blocks, within the software. The computing device normalizes each code segment by extracting the first data element of each computer instruction within the code segment. The first data element may be the first byte. The computing device calculates a probabilistic feature hash signature for each normalized code segment. The computing device may filter out known-good code segments by comparing signatures with a probabilistic hash filter generated from a collection of known-good software. The computing device calculates a similarity value between each pair of unfiltered, normalized code segments. The computing device generates a graph including the normalized code segments and the similarity values. The computing device may cluster the graph using a force-based clustering algorithm.

19 Claims, 6 Drawing Sheets

TECHNOLOGIES FOR SOFTWARE BASIC BLOCK SIMILARITY ANALYSIS

STATEMENT REGARDING FEDERALLY SPONSORED RESEARCH

This invention was made with Government support under contract number FA7000-11-2-0001 awarded by the Department of Homeland Security. The Government has certain rights in this invention.

BACKGROUND

Malicious software ("malware"), such as computer viruses, worms, and trojans, is a serious threat to current computing systems. Additionally, new malware variants are being created constantly. Typical malware detection systems identify malware and malware variants using file signature scanning to identify particular binary files associated with malware. Typically, updated malware signatures are required to detect even minor malware variants.

Many malware researchers believe that many new malware variants may be created by the same individuals or groups, for example through source code reuse. However, typical file signature scanning may not detect similarities between malware caused by code reuse. Currently, the provenance of a particular variant of malware may be determined, for example, by manually examining textual strings or domain names included in the malware binary. Sliding window hashes have been used as a means to determine compiled binary code similarity. One such algorithm is CMU Bitshred, described in Jiyong Jang & David Brumley, *BitShred: Fast, Scalable Code Reuse Detection in Binary Code*, Carnigie Mellon University Technical Report, CMU-CyLab-10-006 (2009).

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
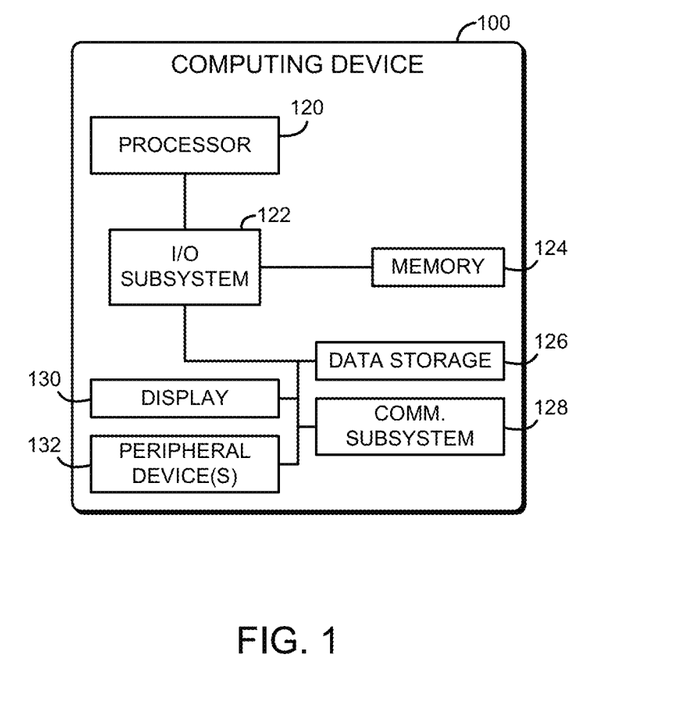
FIG. 1 is a simplified block diagram of at least one embodiment of a computing device for analyzing software basic block similarity.

Referring now to FIG. 1, an illustrative computing device 100 for software analysis includes a processor 120, an I/O subsystem 122, a memory 124, and a data storage device 126. In use, as described below, the computing device 100 is configured to analyze a collection of executable software, such as malware or suspected malware. The computing device 100 determines similarity values between normalized code segments, such as basic blocks, of the software using an n-gram analysis algorithm. The computing device 100 may filter out known-good or benign code segments based on similarity to known-good sample software. The computing device 100 may generate a clustered graph of the basic blocks of the software. A user of the computing device 100 may visually or interactively analyze the graph to identify similarity between analyzed software. The computing device 100 may allow the user to identify related software based on code reuse, algorithm similarity, and other features that may be used to identify the provenance of the software. Normalizing the code segments may improve matching accuracy by reducing waterfall fouling caused by minor changes to the executable code. Filtering known-good code segments may improve performance, allowing for automated or semiautomated analysis of emerging threats.

The computing device 100 may be embodied as any type of device capable of analyzing software and otherwise performing the functions described herein. For example, the computing device 100 may be embodied as, without limitation, a laptop computer, a notebook computer, a tablet computer, a smartphone, a mobile computing device, a computer, a desktop computer, a workstation, a server computer, a distributed computing system, a multiprocessor system, a consumer electronic device, a smart appliance, and/or any other computing device capable of analyzing software code segments. As shown in FIG. 1, the illustrative computing device 100 includes the processor 120, the I/O subsystem 122, the memory 124, and the data storage device 126. Of course, the computing device 100 may include other or additional components, such as those commonly found in a workstation (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. For example, the processor may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the computing device 100 such operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the computing device 100. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the computing device 100, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. The data storage device 126 may store software to be analyzed, including collections of potentially malicious software (malware) or known-good software (goodware).

The computing device 100 may also include a communication subsystem 128, which may be embodied as any communication circuit, device, or collection thereof, capable of enabling communications between the computing device 100 and other remote devices over a computer network (not shown). The communication subsystem 128 may be configured to use any one or more communication technology (e.g., wired or wireless communications) and associated protocols (e.g., Ethernet, Bluetooth®, Wi-Fi®, WiMAX, etc.) to effect such communication.

Additionally, the computing device 100 may include a display 130 that may be embodied as any type of display capable of displaying digital information such as a liquid crystal display (LCD), a light emitting diode (LED), a plasma display, a cathode ray tube (CRT), or other type of display device. In some embodiments, the computing device 100 may also include one or more peripheral devices 132. The peripheral devices 132 may include any number of additional input/output devices, interface devices, and/or other peripheral devices.

Figure 2:
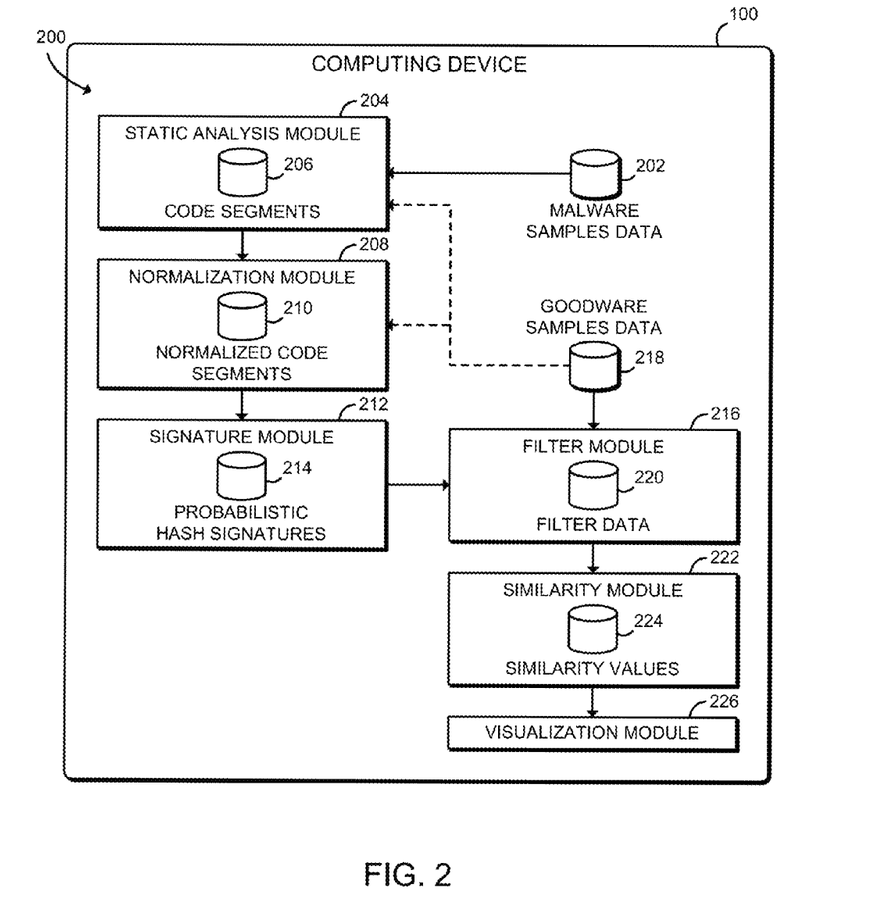
FIG. 2 is a simplified block diagram of at least one embodiment of an environment of the computing device of FIG. 1.

Referring now to FIG. 2, in the illustrative embodiment, the computing device 100 establishes an environment 200 during operation. The illustrative embodiment 200 includes a static analysis module 204, a normalization module 208, a signature module 212, a filter module 216, a similarity module 222, and a visualization module 226. The various modules of the environment 200 may be embodied as hardware, firmware, software, or a combination thereof. For example, each of the modules, logic, and other components of the environment 200 may form a portion of, or otherwise be established by, the processor 120 or other hardware components of the computing device 100.

The static analysis module 204 is configured to identify a plurality of code segments 206 within malware samples data 202. The malware samples data 202 may be embodied as any collection of executable code, object code, bytecode, executable files, library files, or other binary code that may potentially contain malware. The malware samples data 202 may be supplied by a user of the computing device 100, or may be identified automatically. Malware is often obfuscated or "packed," for example by compressing or encrypting executable code within an executable file. In some embodiments, the static analysis module 204 may be configured to unpack or otherwise deobfuscate the malware samples data 202. Each code segment 206 may be embodied as a basic block, an executable segment, a function, an algorithm, or any other subdivision of the malware samples data 202. As described below, the computing device 100 analyzes the code segments 206 for similarity.

The normalization module 208 is configured to extract the first byte from each instruction of a code segment 206 to generate a normalized code segment 210. In some embodiments, the normalization module 208 may be configured to extract a different data element from each of the code segments 206. Thus, each normalized code segment 210 includes a single data element, for example a single byte, representing each instruction of a corresponding code segment 206.

The signature module 212 is configured to determine a probabilistic hash signature 214 for each normalized code segment 210 using an n-gram analysis algorithm. An n-gram may be embodied as a group of n consecutive bytes selected from the normalized code segment 210. As described below, the signature module 212 may apply a sliding window of width n to each normalized code segment 210, determining a hash value for each window. Each signature 214 may be embodied as a bit vector, with each set bit corresponding to a hash value for an n-gram found within the associated normalized code segment 210.

The filter module 216 is configured to filter out normalized code segments 210 as a function of known-good software ("goodware") samples data 218. The goodware samples data 218 may be embodied as any collection of executable code, object code, bytecode, executable files, library files, or other binary code that is trusted or otherwise known not to contain malware. The filter module 216 is configured to generate filter data 220 as a function of the goodware samples data 218. The filter data 220 may be embodied as any database, bit field, or other data structure capable of storing a collection of probabilistic hash signatures, similar to the signatures 214. The filter module 216 (or, in some embodiments the static analysis module 204, the normalization module 208, and/or the signature module 212) is configured to generate the filter data 220 using the same n-gram analysis algorithm used to generate the signatures 214. The filter module 216 is configured to filter the normalized code segments 210 by determining whether the associated signatures 214 are included in the filter data 220.

The similarity module 222 is configured to determine a similarity value 224 between each normalized code segment 210 and the other normalized code segments 210. Each similarity value 224 may be determined as a function of the signatures 214 of each normalized code segment 210. For example, the similarity value 224 may be embodied as an approximate Jaccard index, as described below. In some embodiments, the similarity module 222 may calculate similarity values 224 only for unfiltered normalized code segments 210; that is, only for normalized code segments 210 that have not been filtered out by the filter module 216.

The visualization module 226 is configured to generate a graph including the normalized code segments 210 and the similarity values 224. The visualization module 226 may cluster the graph using a force-based layout algorithm. In some embodiments, a user may interactively view, manipulate, or otherwise analyze the graph, for example using the display 130 of the computing device 100.

Although illustrated as including both the normalization module 208 and the filter module 216, it should be understood that in some embodiments the environment 200 may include the normalization module 208 but not the filter module 216. In those embodiments, the similarity module 222 may determine similarity values 224 for all normalized code segments 210, without filtering. Similarly, in some embodiments the environment 200 may include the filter module 216 but not the normalization module 208. In those embodiments, the signature module 212 may generate signatures 214 for the code segments 206 rather than the normalized code segments 210.

Figure 3:
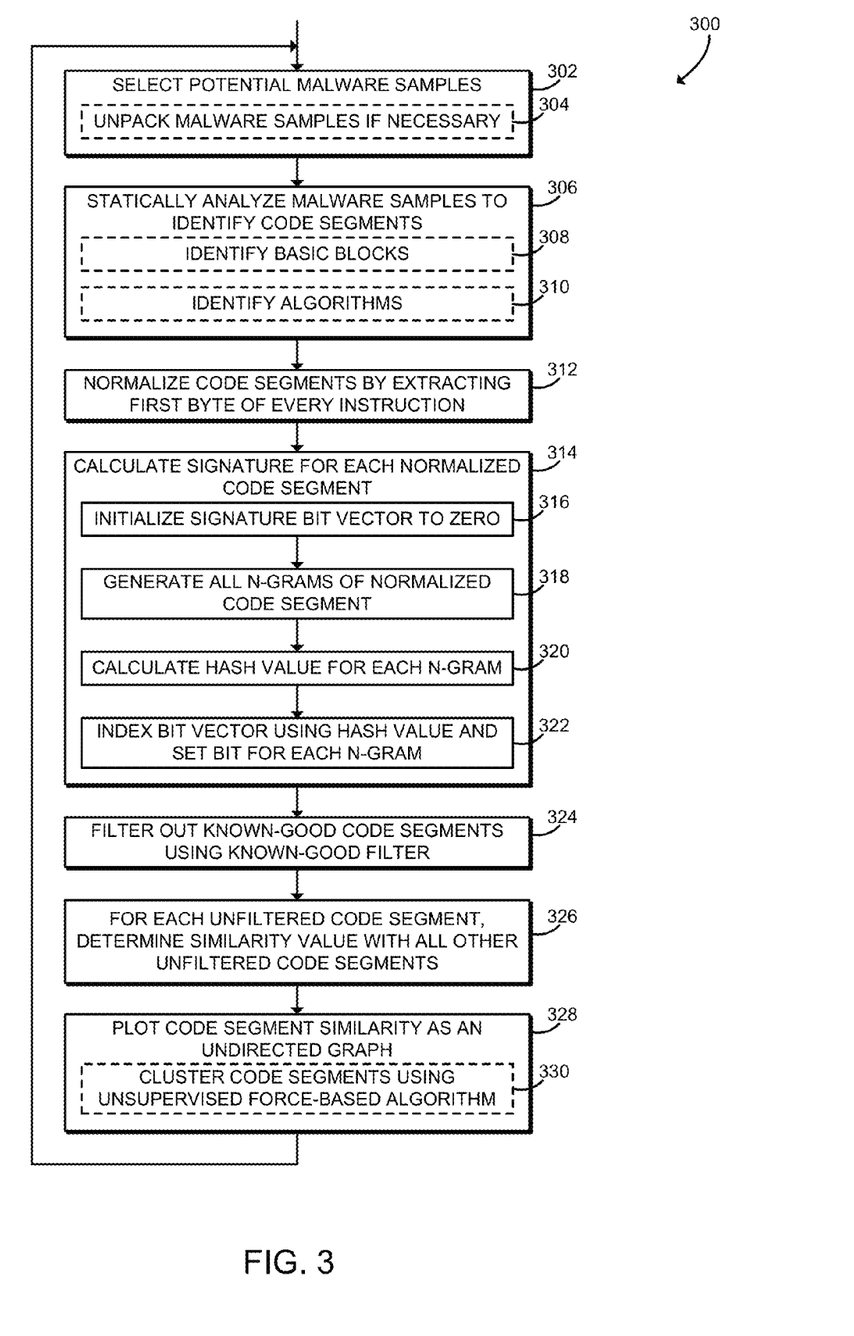
FIG. 3 is a simplified flow diagram of at least one embodiment of a method for analyzing software basic block similarity that may be executed by the computing device of FIGS. 1 and 2.

Referring now to FIG. 3, in use, the computing device 100 may execute a method 300 for analyzing similarity of software components. The method 300 begins in block 302, in which the computing device 100 selects potential malicious software (malware) samples data 202 for analysis. The computing device 100 may use any technique for selecting malware samples data 202 for analysis. For example, in some embodiments, a user of the computing device 100 may provide malware samples, such as suspected malware or a newly discovered malware variant. Additionally or alternatively, in some embodiments the computing device 100 may select the malware samples data 202 in an automated fashion, for example by analyzing all malware samples included in the malware samples data 202. Of course, although the method 300 illustrates analysis of potential malware, it should be understood that in other embodiments any software may be analyzed. For example, in some embodiments untrusted or unverified code may be analyzed for similarity with known malware, or known-good code may be analyzed for similarity (e.g., to detect unauthorized copying). In some embodiments, in block 304, the computing device 100 may deobfuscate, or "unpack," the malware samples data 202, if necessary. The computing device 100 may use a modular plugin or other unpacker to deobfuscate the malware samples data 202, allowing the computing device 100 to adapt to varying forms of code obfuscation.

In block 306, the computing device 100 statically analyzes the malware samples data 202 to identify code segments 206 to be analyzed. That is, the computing device 100 analyzes the malware samples data 202 without executing the malware samples. The computing device 100 may analyze any type of code segment 206 of the malware samples. For example, the computing device 100 may analyze entire text segments of the malware samples, such as .text segments of Windows executables or dynamic link libraries (DLLs), text segments of ELF-format executables, text segments of Mach-O executables, or any other executable segment of a malware sample. In block 308, in some embodiments, the computing device 100 may identify basic blocks 206 included in the malware samples. The computing device 100 may use any suitable technique to identify the basic blocks 206. For example, the computing device 100 may use a static analysis tool such as IDA Professional to identify the basic blocks 206. In block 310, in some embodiments, the computing device 100 may identify entire algorithms 206 within the malware samples. Algorithms 206 may include loops, branches, and other control flow structures, and thus may span more than one basic block. Again, the computing device 100 may use any suitable technique to identify the algorithms 206 as discussed above.

In block 312, the computing device 100 normalizes the code segments 206. In the illustrative embodiment, the computing device 100 normalizes the code by extracting the first byte of every computer instruction included in the code segment 206. Thus, for each code segment 206 included in the malware samples, the computing device 100 generates a corresponding normalized code segment 210. For example, the computing device 100 may extract the first byte of every computer instruction included in a basic block 206 or in an algorithm 206. Extracting the first byte of each computer instruction may allow each instruction to be represented by a constant amount of data. For example, many computer architectures, including Intel® IA-32 Intel® 64, use variable-length instructions, and extracting the first byte of each computer instruction represents each instruction using a single byte. Additionally, extracting the first byte of each instruction may disregard the operands used by instructions, such as registers or memory addresses, while still retaining the overall structure of a code segment 210. Thus, by disregarding operands that may change due to small changes in the code (e.g., memory address offsets that change due the addition of a function argument), waterfall fouling may be avoided and match accuracy may be improved. Additionally, although in the illustrative embodiment the computing device 100 extracts the first byte of each instruction, it should be understood that in other embodiments the computing device 100 may extract any constant-sized data element of each instruction. For example, in some embodiments the computing device 100 may extract opcodes, words, nibbles, or any other segment from each instruction.

Figure 4:
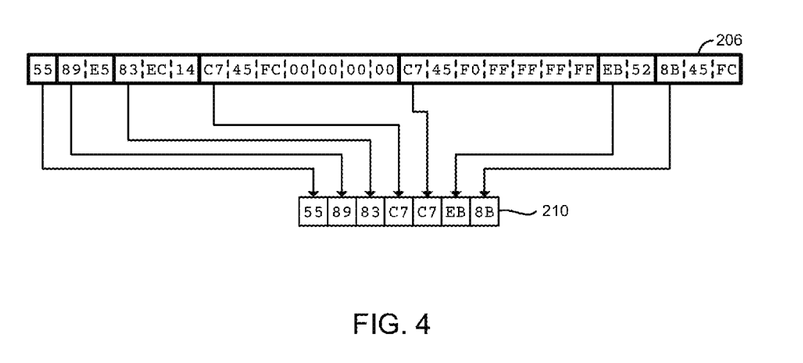
FIG. 4 is a schematic diagram of basic block normalization that may be performed by the method of FIG. 3.

Referring now to FIG. 4, a schematic diagram 400 illustrates an embodiment of normalization of a code segment 206 to generate a normalized code segment 210. As shown, the illustrative code segment 206 includes seven processor instructions. Each processor instruction may be represented by a variable number of bytes; in the illustrative example, the illustrative code segment 206 occupies 25 bytes. As shown, the first byte from each instruction is extracted, in order, to generate the normalized code segment 210. The normalized code segment 210 occupies seven bytes.

Referring back to FIG. 3, in block 314, the computing device 100 calculates a signature 214 for each normalized code segment 210. In particular, the computing device 100 may calculate a probabilistic hash signature 214 for each normalized code segment 210 using an n-gram analysis algorithm as described in blocks 316 through 322. In block 316, for each normalized code segment 210 the computing device 100 initializes a bit vector to all zeroes. The bit vector is used to store the probabilistic hash signature 214 corresponding to that normalized code segment 210.

In block 318, the computing device 100 generates all n-grams for the normalized code segment 210. Each n-gram may be embodied as a group of n consecutive bytes selected from the normalized code segment 210. The computing device 100 may generate the n-grams, for example, by applying a sliding window of size n to the normalized code segment 210. The computing device 100 may generate the n-grams in space or in time; for example the computing device 100 may generate an array of all n-grams or may iterate through all n-grams.

In block 320, the computing device 100 calculates a hash value for each of the n-grams. The computing device 100 may use any appropriate hash function to calculate the n-grams. For example, the computing device 100 may apply an MD5 hash function to generate the hash value for each n-gram.

In block 322, for each n-gram, the computing device 100 indexes the bit vector using the corresponding hash value and sets the indexed bit of the bit vector. For example, the computing device 100 may determine the index by dividing the hash value modulo the width of the bit vector. In other words, if the bit vector has width x, the index may be determined as the x least-significant bits of the hash value. The resulting bit vector represents the probabilistic hash signature 214 of all of the n-grams included in the normalized code segment 210. Ideally, each set bit in the bit vector would indicate that the n-gram of the corresponding hash value was found in the normalized code segment 210. However, because some hash values may collide, that is, index to the same bit of the bit vector, the signature 214 is a probabilistic indication of whether the n-gram of the corresponding hash value was found in the normalized code segment 210.

Figure 5:
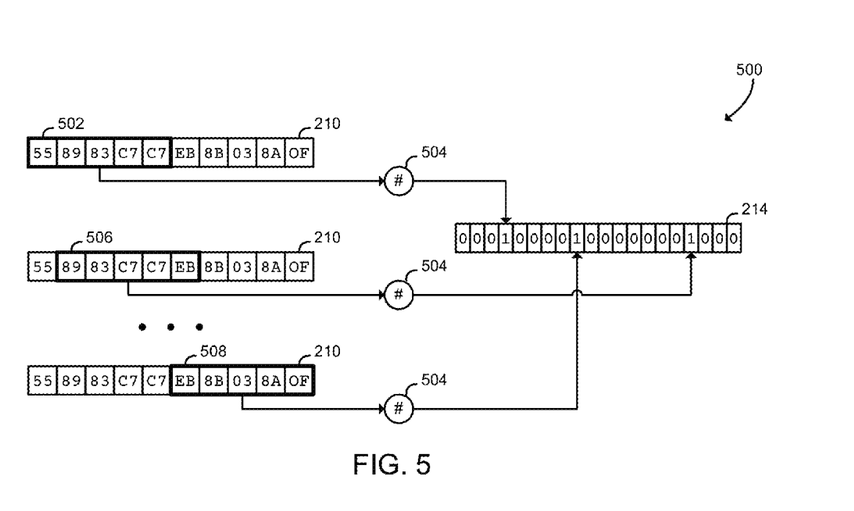
FIG. 5 is a schematic diagram of probabilistic hash fingerprint generation that may be performed by the method of FIG. 3.

Referring now to FIG. 5, the schematic diagram 500 illustrates an embodiment of the calculation of the signature 214 for a normalized code segment 210. As shown, an n-gram 502 includes the first five bytes of the normalized code segment 210. Thus, in the illustrative embodiment, n is equal to five; of course, in other embodiments other values of n may be used. Therefore, as described above, the n-gram 502 also corresponds to the first five instructions of the corresponding code segment 206. The n-gram 502 is fed as input to a hash function 504. The output of the hash function 504 is used to index into a bit vector of the signature 214. The bit at that position—in the illustrative example, the fourth bit—is set to "1." The rest of the signature 214 may be calculated by sliding a window of width n through the rest of the normalized code segment 210. As shown, the next n-gram 506 includes five bytes selected from positions two through six of the normalized code segment 210. The n-gram 506 is fed to the hash function 504, and the resulting hash value is used to index the signature 214 and set the appropriate bit. Calculation of the signature 214 may continue to the n-gram 508, which includes the last five bytes of the normalized code segment 210. The n-gram 508 is similarly fed to the hash function 504, and the resulting hash value is used to index the signatures 214 and set the appropriate bit.

Referring back to FIG. 3, after calculating the signature 214 for each normalized code segment 210, in block 324 the computing device 100 may filter out known-good code segments 210 using the filter data 220. As described above, the filter data 220 may include a set of probabilistic hash values corresponding to a collection of normalized code segments of the goodware samples data 218. The goodware samples data 218 may include, for example, operating system code, library code, commercial applications, or other software that is known to be safe. Calculation of the filter data 220 is further described below in connection with FIG. 6. The computing device 100 may perform a set-inclusion operation to determine whether each signature 214 is included in the filter data 220. If the signature 214 matches the filter data 220, the corresponding normalized code segment 210 may be marked as filtered or otherwise distinguished from unfiltered normalized coded segments 210 that do not match the filter data 220. In some embodiments, the computing device 100 may not apply the filter data 220 or may apply empty filter data 220. In those embodiments, all normalized code segments 210 may be designated unfiltered.

In block 326, for each unfiltered normalized code segment 210, the computing device 100 determines a similarity value 224 in relation to all of the other unfiltered normalized code segments 210. Thus, calculation of the similarity values 224 is of $O(n^2)$ complexity. Filtering out known-good normalized code segments 210, as described above in block 324, is a linear operation, of $O(n)$ complexity. Thus, filtering may reduce total calculation time by reducing the problem space for the calculation of similarity values 224. The computing device 100 may calculate the similarity value 224 as an approximate Jaccard index of the features of the normalized code segments 210. All of the n-grams of a normalized code segment 210 may be considered to be feature set $F_1$ of that normalized code segment 210. Thus, each bit of the corresponding signature 214 is a probabilistic indication that a particular feature, or n-gram, was present in the normalized code segment 210. Accordingly, the computing device 100 may calculate an approximate Jaccard index similarity value as the ratio of the number of set bits of the intersection of the signatures 214 of each normalized code segment 210 to the number of set bits of the union of the signatures 214 of each normalized code segment 210. That similarity value 224 represents the ratio of matching n-grams to possible matches for two signatures 214. One potential embodiment of a calculation of the approximate Jaccard index is illustrated below in Equation 1. $B_a$ and $B_b$ represent bit vectors of the signatures 214. S( ) represents a function to count the number of set bits. $J(F_a, F_b)$ represents the Jaccard index of two feature sets, and may have values from zero to one.

$$J(F_a, F_b) \approx \frac{S(B_a \wedge B_b)}{S(B_a \vee B_b)} \quad (1)$$

In block 328, the computing device 100 plots the similarity between normalized code segments 210 as a graph.

The computing device 100 may generate a node in the graph for each normalized code segment 210. The graph may include parent nodes corresponding to each malware sample within the malware samples data 202, and each parent node may be associated with child nodes for the appropriate normalized code segments 210. The computing device 100 may generate a node for both filtered and unfiltered normalized code segments 210. For each unfiltered normalized code segment 210, the computing device 100 may generate an edge connecting the normalized code segment 210 to each other normalized code segment 210 having a similarity value 224 above a threshold similarity value. Accordingly, because no similarity values 224 are calculated for filtered normalized code segments 210, no edges connect to the filtered normalized code segments 210. The computing device 100 may present the graph to a user, for example by displaying the graph interactively using the display 130.

In some embodiments, in block 330, the computing device 100 may cluster the normalized code segments 210 in the graph using an unsupervised force-based algorithm, also known as a push-pull algorithm. The clusters identified in the graph may identify similar groups of normalized code segments 210 and thus may identify similarities between malware samples. The computing device 100 may perform the clustering analysis in an automated or offline manner, and/or may perform the analysis interactively using the display 130. After analyzing the normalized code segments 210, the method 300 loops back to block 302 select additional malware samples for analysis.

Figure 6:
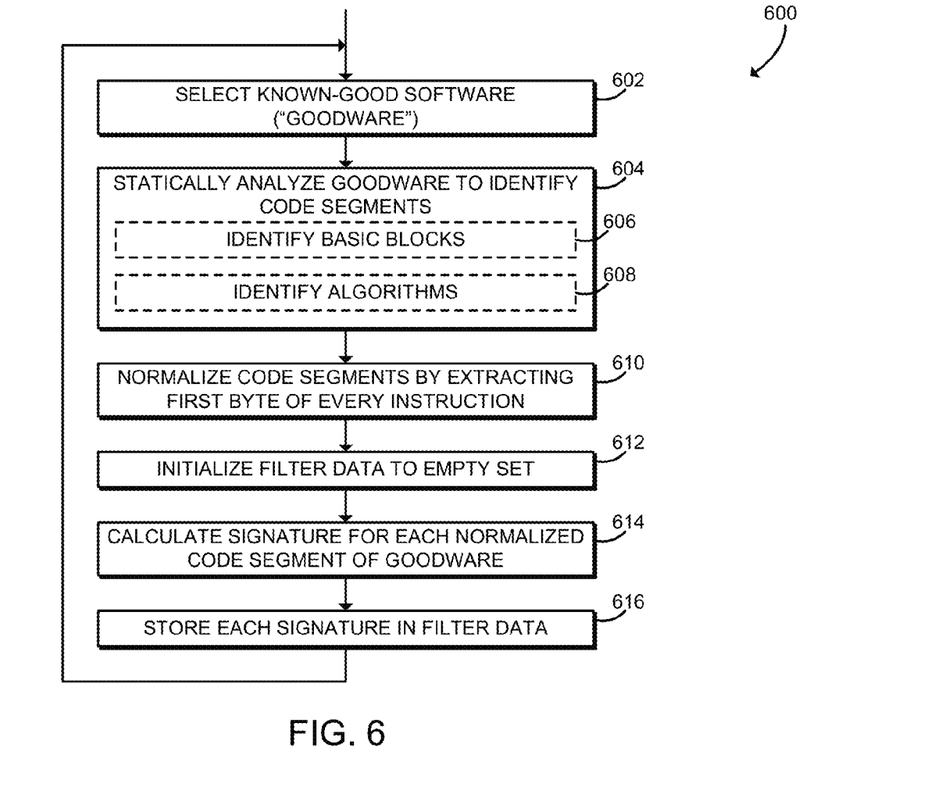
FIG. 6 is a simplified flow diagram of at least one embodiment of a method for generating a known-good filter that may be executed by the computing device of FIGS. 1 and 2.

Referring now to FIG. 6, in use, the computing device 100 may execute a method 600 for generating a known-good filter. The method 600 begins in block 602, in which the computing device 100 selects goodware samples data 218. The goodware samples data 218 may include, for example, executable files for a known-good operating system of the computing device 100. The goodware samples data 218 may include all of the binary files included in a system directory (e.g., the SYSTEM32 directory on Windows or the "/bin" directory on Unix variants). In some embodiments, the goodware samples data 218 may include a known-good application binary, such as a web browser.

In block 604, similar to as described above in connection with block 306 of FIG. 3, the computing device 100 statically analyzes the goodware samples data 218 to identify code segments 206 to be analyzed. The computing device 100 may analyze any type of code segment 206 of the goodware samples. For example, the computing device 100 may analyze entire text segments of the malware samples, such as .text segments of Windows executables or dynamic link libraries (DLLs), text segments of ELF-format executables, text segments of Mach-O executables, or any other executable segment of a goodware sample. In block 606, in some embodiments, the computing device 100 may identify basic blocks 206 included in the goodware samples. The computing device 100 may use a static analysis tool such as IDA Professional to identify the basic blocks 206. In block 608, in some embodiments, the computing device 100 may identify entire algorithms 206 within the goodware samples. Algorithms 206 may include loops, branches, and other control flow structures, and thus may span more than one basic block.

In block 610, similar to as described above in connection with block 312 of FIG. 3, the computing device 100 normalizes the code segments 206 by extracting the first byte of every computer instruction included in the code segment. Thus, for each code segment 206 included in the goodware samples, the computing device 100 generates a corresponding normalized code segment 210. For example, the computing device 100 may extract the first byte of every computer instruction included in a basic block 206 or in an algorithm 206.

In block 612, the computing device 100 initializes the filter data 220 to the empty set. For example, in some embodiments, the computing device 100 may initialize a large bit field of the filter data 220 to all zeroes. In block 614, the computing device 100 calculates a probabilistic hash signature of each normalized code segment 210 of the goodware sample data 218. The computing device 100 applies the same n-gram analysis used to generate the signatures 214, as described above in connection with blocks 314 through 322 of FIG. 3. In block 616, the computing device 100 stores each signature associated with the normalized code segments 210 of the goodware sample data 218 into the filter data 220. The computing device 100 may store the signatures in any appropriate format. For example, the computing device 100 may store a bit vector corresponding to the signature in a large bit field corresponding to the filter data 220. After being stored in the filter data 220, the computing device 100 may test the filter data 220 for set inclusion, as described above in connection with block 324 of FIG. 3. After generating the filter data 220, the method 600 loops back to block 602, in which additional goodware samples data 218 may be selected.

Figure 7:
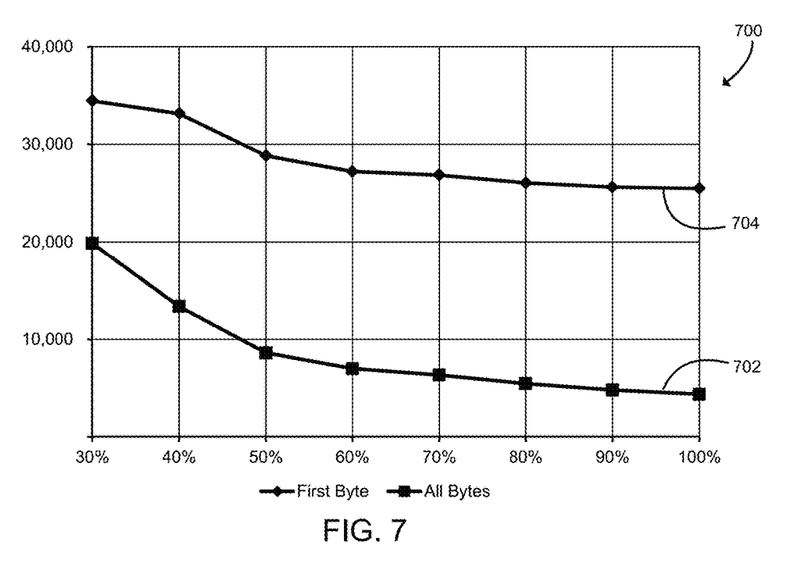
FIG. 7 is a chart illustrating sample results that may be achieved by the computing device of FIGS. 1 and 2.

Referring now to FIG. 7, the chart 700 illustrates sample results that may be achieved using technologies described in this disclosure. In particular, the chart 700 illustrates illustrative results that may be achieved for a sample set of malware samples data 202 including 10,000 basic blocks. The chart 700 illustrates the number of matching basic blocks on the y-axis and the percentage similarity threshold used to determine a match on the x-axis. The curve 702 illustrates matches found considering all bytes of the basic blocks. That is, the curve 702 illustrates results for calculating signatures 214 based on full code segments 206 rather than normalized code segments 210. The curve 704 illustrates matches found considering the first byte of each basic block. That is, the curve 704 illustrates results for calculating signatures 214 based on normalized code segments 210, as described above in connection with FIG. 3. As shown, calculating hash signatures 214 based on normalized code segments 210 produces many more matches at the same matching threshold compared to calculating hash signatures 214 based on code segments 206.

Figure 8:
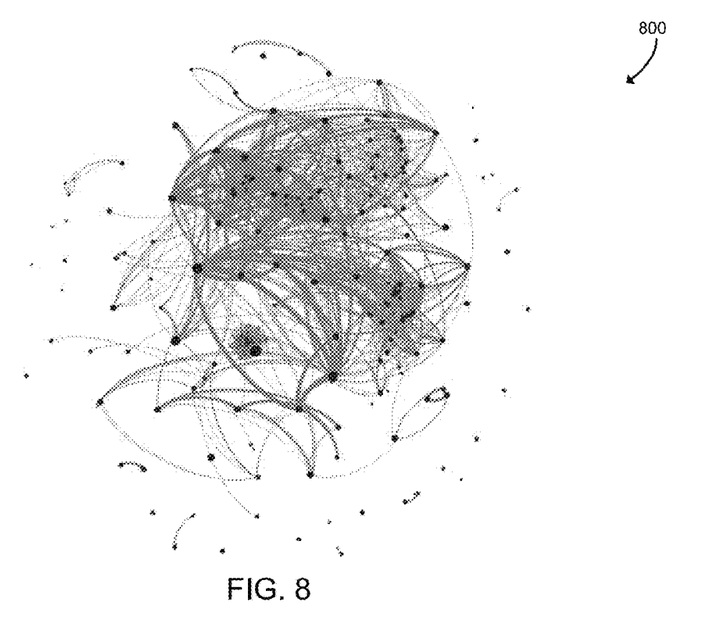
FIG. 8 is a plot illustrating a sample graph that may be generated by the computing device of FIGS. 1 and 2.

Referring now to FIG. 8, the diagram 800 illustrates a sample graph plotting the similarities between normalized code segments 210. In the illustrative diagram 800, each node represents a basic block, and each edge represents a similarity value between basic blocks. Filtered basic blocks appear in the diagram 800, but are not connected to any edges. The diagram 800 has been laid out using a force-based clustering algorithm to help identify similarity relationships. A human operator may analyze the diagram 800 visually and/or interactively to identify relationships between the normalized code segments 210 and thus between the malware samples data 202.

EXAMPLES

Illustrative examples of the technologies disclosed herein are provided below. An embodiment of the technologies may include any one or more, and any combination of, the examples described below.

Example 1 includes a computing device for software analysis, the computing device comprising a static analysis module to identify a plurality of code segments within a collection of software; a normalization module to, for each code segment of the plurality of code segments, extract a first data element from each computer instruction of the corresponding code segment to generate a normalized code segment; a signature module to determine a probabilistic hash signature for each normalized code segment using an n-gram analysis algorithm; and a similarity module to determine a similarity value for each pair of normalized code segments as a function of the probabilistic hash signatures of the corresponding pair of normalized code segments, wherein each similarity value is indicative of code similarity between the corresponding pair of normalized code segments.

Example 2 includes the subject matter of Example 1, and wherein the collection of software comprises a collection of known malware.

Example 3 includes the subject matter of any of Examples 1 and 2, and wherein the first data element of each computer instruction comprises a first byte of each computer instruction.

Example 4 includes the subject matter of any of Examples 1-3, and wherein each code segment of the plurality of code segments comprises an executable section of an application binary.

Example 5 includes the subject matter of any of Examples 1-4, and wherein each code segment of the plurality of code segments comprises a basic block.

Example 6 includes the subject matter of any of Examples 1-5, and wherein to identify the plurality of code segments comprises to statically analyze the collection of software to identify the basic blocks.

Example 7 includes the subject matter of any of Examples 1-6, and wherein each code segment of the plurality of code segments comprises an algorithm.

Example 8 includes the subject matter of any of Examples 1-7, and wherein the static analysis module is further to deobfuscate the collection of software prior to identification of the plurality of code segments within the collection of software.

Example 9 includes the subject matter of any of Examples 1-8, and wherein to determine the probabilistic hash signature for each normalized code segment using the n-gram analysis algorithm comprises to, for each normalized code segment clear all bits of a signature bit vector associated with the corresponding normalized code segment; generate a plurality of n-grams as a function of the corresponding normalized code segment, using a sliding window of width n; and for each n-gram of the plurality of n-grams: (i) apply a hash function to the corresponding n-gram to generate a hash value, (ii) determine a bit index as a function of the hash value, and (iii) set a bit within the signature bit vector at the bit index.

Example 10 includes the subject matter of any of Examples 1-9, and wherein the hash function comprises an MD5 hash function.

Example 11 includes the subject matter of any of Examples 1-10, and wherein to determine the bit index comprises to determine a first number of least-significant bits of the hash value.

Example 12 includes the subject matter of any of Examples 1-11, and further including a filter module to filter the plurality of normalized code segments as a function of a plurality of known-good normalized code segments to identify unfiltered normalized code segments of the normalized code segments; wherein to determine the similarity value for each pair of normalized code segments comprises to determine the similarity value for each pair of unfiltered normalized code segments.

Example 13 includes the subject matter of any of Examples 1-12, and wherein to filter the plurality of normalized code segments comprises to determine whether the probabilistic hash signature of the normalized code segment is included in a filter bit vector generated as a function of the plurality of known-good normalized code segments.

Example 14 includes the subject matter of any of Examples 1-13, and wherein the static analysis module is further to identify a second plurality of code segments within a collection of known-good software; the normalization module is further to, for each code segment of the second plurality of code segments, extract a first data element from each computer instruction of the code segment to generate a known-good normalized code segment within the plurality of known-good normalized code segments; and the filter module is further to determine the filter bit vector as a function of the plurality of known-good normalized code segments.

Example 15 includes the subject matter of any of Examples 1-14, and wherein to determine the filter bit vector comprises to determine the filter bit vector as a function of the plurality of known-good normalized code segments using the n-gram analysis algorithm.

Example 16 includes the subject matter of any of Examples 1-15, and further including a visualization module to generate a graph including the similarity values.

Example 17 includes the subject matter of any of Examples 1-16, and wherein to generate the graph including the similarity values comprises to create a node for each normalized code segment; and for each pair of unfiltered normalized code segments, create an edge between the nodes for the corresponding pair of unfiltered normalized code segments if the similarity value of the corresponding pair of unfiltered normalized code segments has a predefined relationship with a threshold similarity value.

Example 18 includes the subject matter of any of Examples 1-17, and wherein the visualization module is further to cluster the graph using a force-based clustering layout algorithm.

Example 19 includes the subject matter of any of Examples 1-18, and wherein to cluster the graph comprises to interactively display the graph using a display of the computing device.

Example 20 includes the subject matter of any of Examples 1-19, and wherein to determine the similarity value comprises to determine an approximate Jaccard index of the probabilistic hash signatures of each pair of normalized code segments.

Example 21 includes a computing device for software analysis, the computing device comprising a static analysis module to identify a plurality of code segments within a collection of software; a signature module to determine a probabilistic hash signature for each code segment using an n-gram analysis algorithm; a filter module to filter the plurality of code segments as a function of a plurality of known-good code segments to identify unfiltered code segments of the code segments; and a similarity module to determine a similarity value for each pair of unfiltered code segments as a function of the probabilistic hash signatures of the corresponding pair of unfiltered code segments, wherein each similarity value is indicative of code similarity between the corresponding pair of unfiltered code segments.

Example 22 includes the subject matter of Example 21, and wherein to filter the plurality of code segments comprises to determine whether the probabilistic hash signature of the code segment is included in a filter bit vector generated as a function of the plurality of known-good code segments.

Example 23 includes the subject matter of any of Examples 21 and 22, and wherein the filter module is further to determine the filter bit vector as a function of the known-good code segments using the n-gram analysis algorithm.

Example 24 includes a method for software analysis, the method comprising identifying, by a computing device, a plurality of code segments within a collection of software; extracting, by the computing device and for each code segment of the plurality of code segments, a first data element from each computer instruction of the corresponding code segment to generate a normalized code segment; determining, by the computing device, a probabilistic hash signature for each normalized code segment using an n-gram analysis algorithm; and determining, by the computing device, a similarity value for each pair of normalized code segments as a function of the probabilistic hash signatures of the corresponding pair of normalized code segments, wherein each similarity value is indicative of code similarity between the corresponding pair of normalized code segments.

Example 25 includes the subject matter of Example 24, and wherein the collection of software comprises a collection of known malware.

Example 26 includes the subject matter of any of Examples 24 and 25, and wherein extracting the first data element of each computer instruction comprises extracting a first byte of each computer instruction.

Example 27 includes the subject matter of any of Examples 24-26, and wherein each code segment of the plurality of code segments comprises an executable section of an application binary.

Example 28 includes the subject matter of any of Examples 24-27, and wherein each code segment of the plurality of code segments comprises a basic block.

Example 29 includes the subject matter of any of Examples 24-28, and wherein identifying the plurality of code segments comprises statically analyzing the collection of software to identify the basic blocks.

Example 30 includes the subject matter of any of Examples 24-29, and wherein each code segment of the plurality of code segments comprises an algorithm.

Example 31 includes the subject matter of any of Examples 24-30, and further including deobfuscating, by the computing device, the collection of software prior to identifying the plurality of code segments within the collection of software.

Example 32 includes the subject matter of any of Examples 24-31, and wherein determining the probabilistic hash signature for each normalized code segment using the n-gram analysis algorithm comprises, for each normalized code segment clearing all bits of a signature bit vector associated with the corresponding normalized code segment; generating a plurality of n-grams as a function of the corresponding normalized code segment, using a sliding window of width n; and for each n-gram of the plurality of n-grams: (i) applying a hash function to the corresponding n-gram to generate a hash value, (ii) determining a bit index as a function of the hash value, and (iii) setting a bit within the signature bit vector at the bit index.

Example 33 includes the subject matter of any of Examples 24-32, and wherein applying the hash function comprises applying an MD5 hash function.

Example 34 includes the subject matter of any of Examples 24-33, and wherein determining the bit index comprises determining a first number of least-significant bits of the hash value.

Example 35 includes the subject matter of any of Examples 24-34, and further including filtering, by the computing device, the plurality of normalized code segments as a function of a plurality of known-good normalized code segments to identify unfiltered normalized code segments of the normalized code segments; wherein determining the similarity value for each pair of normalized code segments comprises determining the similarity value for each pair of unfiltered normalized code segments.

Example 36 includes the subject matter of any of Examples 24-35, and wherein filtering the plurality of normalized code segments comprises determining whether the probabilistic hash signature of the normalized code segment is included in a filter bit vector generated as a function of the plurality of known-good normalized code segments.

Example 37 includes the subject matter of any of Examples 24-36, and further including identifying, by the computing device, a second plurality of code segments within a collection of known-good software; for each code segment of the second plurality of code segments, extracting, by the computing device, a first data element from each computer instruction of the code segment to generate a known-good normalized code segment within the plurality of known-good normalized code segments; and determining, by the computing device, the filter bit vector as a function of the plurality of known-good normalized code segments.

Example 38 includes the subject matter of any of Examples 24-37, and wherein determining the filter bit vector comprises determining the filter bit vector as a function of the plurality of known-good normalized code segments using the n-gram analysis algorithm.

Example 39 includes the subject matter of any of Examples 24-38, and further including generating, by the computing device, a graph including the similarity values.

Example 40 includes the subject matter of any of Examples 24-39, and wherein generating the graph including the similarity values comprises creating a node for each normalized code segment; and for each pair of unfiltered normalized code segments, creating an edge between the nodes for the corresponding pair of unfiltered normalized code segments if the similarity value of the corresponding pair of unfiltered normalized code segments has a predefined relationship with a threshold similarity value.

Example 41 includes the subject matter of any of Examples 24-40, and further including clustering, by the computing device, the graph using a force-based clustering layout algorithm.

Example 42 includes the subject matter of any of Examples 24-41, and wherein clustering the graph comprises interactively displaying the graph using a display of the computing device.

Example 43 includes the subject matter of any of Examples 24-42, and wherein determining the similarity value comprises determining an approximate Jaccard index of the probabilistic hash signatures of each pair of normalized code segments.

Example 44 includes a method for software analysis, the method comprising identifying, by a computing device, a plurality of code segments within a collection of software; determining, by the computing device, a probabilistic hash signature for each code segment using an n-gram analysis algorithm; filtering, by the computing device, the plurality of code segments as a function of a plurality of known-good code segments to identify unfiltered code segments of the code segments; and determining, by the computing device, a similarity value for each pair of unfiltered code segments as a function of the probabilistic hash signatures of the corresponding pair of unfiltered code segments, wherein each similarity value is indicative of code similarity between the corresponding pair of unfiltered code segments.

Example 45 includes the subject matter of Example 44, and filtering the plurality of code segments comprises determining whether the probabilistic hash signature of the code segment is included in a filter bit vector generated as a function of the plurality of known-good code segments.

Example 46 includes the subject matter of any of Examples 44 and 45, and further including determining, by the computing device, the filter bit vector as a function of the known-good code segments using the n-gram analysis algorithm.

Example 47 includes a computing device comprising a processor; and a memory having stored therein a plurality of instructions that when executed by the processor cause the computing device to perform the method of any of Examples 24-46.

Example 48 includes one or more machine readable storage media comprising a plurality of instructions stored thereon that in response to being executed result in a computing device performing the method of any of Examples 24-46.

Example 49 includes a computing device comprising means for performing the method of any of Examples 24-46.

Example 50 includes a computing device for software analysis, the computing device comprising means for identifying a plurality of code segments within a collection of software; means for extracting, for each code segment of the plurality of code segments, a first data element from each computer instruction of the corresponding code segment to generate a normalized code segment; means for determining a probabilistic hash signature for each normalized code segment using an n-gram analysis algorithm; and means for determining a similarity value for each pair of normalized code segments as a function of the probabilistic hash signatures of the corresponding pair of normalized code segments, wherein each similarity value is indicative of code similarity between the corresponding pair of normalized code segments.

Example 51 includes the subject matter of Example 50, and wherein the collection of software comprises a collection of known malware.

Example 52 includes the subject matter of any of Examples 50 and 51, and wherein the means for extracting the first data element of each computer instruction comprises means for extracting a first byte of each computer instruction.

Example 53 includes the subject matter of any of Examples 50-52, and wherein each code segment of the plurality of code segments comprises an executable section of an application binary.

Example 54 includes the subject matter of any of Examples 50-53, and wherein each code segment of the plurality of code segments comprises a basic block.

Example 55 includes the subject matter of any of Examples 50-54, and wherein the means for identifying the plurality of code segments comprises means for statically analyzing the collection of software to identify the basic blocks.

Example 56 includes the subject matter of any of Examples 50-55, and wherein each code segment of the plurality of code segments comprises an algorithm.

Example 57 includes the subject matter of any of Examples 50-56, and further including means for deobfuscating the collection of software prior to identifying the plurality of code segments within the collection of software.

Example 58 includes the subject matter of any of Examples 50-57, and wherein the means for determining the probabilistic hash signature for each normalized code segment using the n-gram analysis algorithm comprises, for each normalized code segment means for clearing all bits of a signature bit vector associated with the corresponding normalized code segment; means for generating a plurality of n-grams as a function of the corresponding normalized code segment, using a sliding window of width n; and for each n-gram of the plurality of n-grams: (i) means for applying a hash function to the corresponding n-gram to generate a hash value, (ii) means for determining a bit index as a function of the hash value, and (iii) means for setting a bit within the signature bit vector at the bit index.

Example 59 includes the subject matter of any of Examples 50-58, and wherein the means for applying the hash function comprises means for applying an MD5 hash function.

Example 60 includes the subject matter of any of Examples 50-59, and wherein the means for determining the bit index comprises means for determining a first number of least-significant bits of the hash value.

Example 61 includes the subject matter of any of Examples 50-60, and further including means for filtering the plurality of normalized code segments as a function of a plurality of known-good normalized code segments to identify unfiltered normalized code segments of the normalized code segments; wherein the means for determining the similarity value for each pair of normalized code segments comprises means for determining the similarity value for each pair of unfiltered normalized code segments.

Example 62 includes the subject matter of any of Examples 50-61, and wherein the means for filtering the plurality of normalized code segments comprises means for determining whether the probabilistic hash signature of the normalized code segment is included in a filter bit vector generated as a function of the plurality of known-good normalized code segments.

Example 63 includes the subject matter of any of Examples 50-62, and further including means for identifying a second plurality of code segments within a collection of known-good software; for each code segment of the second plurality of code segments, means for extracting a first data element from each computer instruction of the code segment to generate a known-good normalized code segment within the plurality of known-good normalized code segments; and means for determining the filter bit vector as a function of the plurality of known-good normalized code segments.

Example 64 includes the subject matter of any of Examples 50-63, and wherein the means for determining the filter bit vector comprises means for determining the filter bit vector as a function of the plurality of known-good normalized code segments using the n-gram analysis algorithm.

Example 65 includes the subject matter of any of Examples 50-64, and further including means for generating a graph including the similarity values.

Example 66 includes the subject matter of any of Examples 50-65, and wherein the means for generating the graph including the similarity values comprises means for creating a node for each normalized code segment; and for each pair of unfiltered normalized code segments, means for creating an edge between the nodes for the corresponding pair of unfiltered normalized code segments if the similarity value of the corresponding pair of unfiltered normalized code segments has a predefined relationship with a threshold similarity value.

Example 67 includes the subject matter of any of Examples 50-66, and further including means for clustering the graph using a force-based clustering layout algorithm.

Example 68 includes the subject matter of any of Examples 50-67, and wherein the means for clustering the graph comprises means for interactively displaying the graph using a display of the computing device.

Example 69 includes the subject matter of any of Examples 50-68, and wherein the means for determining the similarity value comprises means for determining an approximate Jaccard index of the probabilistic hash signatures of each pair of normalized code segments.

Example 70 includes a computing device for software analysis, the computing device comprising means for identifying a plurality of code segments within a collection of software; means for determining a probabilistic hash signature for each code segment using an n-gram analysis algorithm; means for filtering the plurality of code segments as a function of a plurality of known-good code segments to identify unfiltered code segments of the code segments; and means for determining a similarity value for each pair of unfiltered code segments as a function of the probabilistic hash signatures of the corresponding pair of unfiltered code segments, wherein each similarity value is indicative of code similarity between the corresponding pair of unfiltered code segments.

Example 71 includes the subject matter of Example 70, and wherein the means for filtering the plurality of code segments comprises means for determining whether the probabilistic hash signature of the code segment is included in a filter bit vector generated as a function of the plurality of known-good code segments.

Example 72 includes the subject matter of any of Examples 70 and 71, and further including means for determining the filter bit vector as a function of the known-good code segments using the n-gram analysis algorithm.

The invention claimed is:

1. A computing device for software analysis, the computing device comprising:
a static analysis circuit to identify a plurality of code segments within a collection of software;
a normalization circuit to, for each code segment of the plurality of code segments, extract a first data element from each computer instruction of a corresponding code segment to generate a normalized code segment;
a signature circuit to determine a probabilistic hash signature for each normalized code segment using an n-gram analysis algorithm;
a filter circuit to (i) filter the plurality of normalized code segments as a function of a plurality of known-good normalized code segments to identify unfiltered normalized code segments of the normalized code segments, wherein to filter the plurality of normalized code segments comprises to determine whether the probabilistic hash signature of the normalized code segment is included in a filter bit vector generated as a function of the plurality of known-good normalized code segments, and (ii) determine the filter bit vector as a function of the known-good normalized code segments using the n-gram analysis algorithm; and
a similarity circuit to determine a similarity value for each pair of unfiltered normalized code segments as a function of the probabilistic hash signatures of a corresponding pair of unfiltered normalized code segments, wherein each similarity value is indicative of code similarity between the corresponding pair of unfiltered normalized code segments.

2. The computing device of claim 1, wherein the first data element of each computer instruction comprises a first byte of each computer instruction.

3. The computing device of claim 1, wherein each code segment of the plurality of code segments comprises a basic block.

4. The computing device of claim 3, wherein to identify the plurality of code segments comprises to statically analyze the collection of software to identify the basic blocks.

5. The computing device of claim 1, wherein to determine the probabilistic hash signature for each normalized code segment using the n-gram analysis algorithm comprises to, for each normalized code segment:
clear all bits of a signature bit vector associated with a corresponding normalized code segment;
generate a plurality of n-grams as a function of the corresponding normalized code segment, using a sliding window of width n; and
for each n-gram of the plurality of n-grams: (i) apply a hash function to a corresponding n-gram to generate a hash value, (ii) determine a bit index as a function of the hash value, and (iii) set a bit within the signature bit vector at the bit index.

6. The computing device of claim 1, wherein:
the static analysis circuit is further to identify a second plurality of code segments within a collection of known-good software; and
the normalization circuit is further to, for each code segment of the second plurality of code segments, extract a first data element from each computer instruction of the code segment to generate a known-good normalized code segment within the plurality of known-good normalized code segments.

7. The computing device of claim 1, further comprising a visualization circuit to generate a graph including the similarity values, wherein to generate the graph including the similarity values comprises to:
create a node for each normalized code segment; and
for each pair of unfiltered normalized code segments, create an edge between the nodes for the corresponding pair of unfiltered normalized code segments if the similarity value of the corresponding pair of unfiltered normalized code segments has a predefined relationship with a threshold similarity value.

8. The computing device of claim 7, wherein the visualization circuit is further to cluster the graph using a force-based clustering layout algorithm.

9. The computing device of claim 8, wherein to cluster the graph comprises to interactively display the graph using a display of the computing device.

10. The computing device of claim 1, wherein to determine the similarity value comprises to determine an approximate Jaccard index of the probabilistic hash signatures of each pair of unfiltered normalized code segments.

11. A computing device for software analysis, the computing device comprising:
a static analysis circuit to identify a plurality of code segments within a collection of software;
a signature circuit to determine a probabilistic hash signature for each code segment using an n-gram analysis algorithm;
a filter circuit to (i) filter the plurality of code segments as a function of a plurality of known-good code segments to identify unfiltered code segments of the code segments, wherein to filter the plurality of code segments comprises to determine whether the probabilistic hash signature of the code segment is included in a filter bit vector generated as a function of the plurality of known-good code segments, and (ii) determine the filter bit vector as a function of the known-good code segments using the n-gram analysis algorithm; and a similarity circuit to determine a similarity value for each pair of unfiltered code segments as a function of the probabilistic hash signatures of the corresponding pair of unfiltered code segments, wherein each similarity value is indicative of code similarity between the corresponding pair of unfiltered code segments.

12. One or more non-transitory, computer-readable storage media comprising a plurality of instructions that in response to being executed cause a computing device to:

identify a plurality of code segments within a collection of software;

extract, for each code segment of the plurality of code segments, a first data element from each computer instruction of the corresponding code segment to generate a normalized code segment;

determine a probabilistic hash signature for each normalized code segment using an n-gram analysis algorithm;

filter the plurality of normalized code segments as a function of a plurality of known-good normalized code segments to identify unfiltered normalized code segments of the normalized code segments, wherein to filter the plurality of normalized code segments comprises to determine whether the probabilistic hash signature of the normalized code segment is included in a filter bit vector generated as a function of the plurality of known-good normalized code segments;

determine the filter bit vector as a function of the known-good normalized code segments using the n-gram analysis algorithm; and determine a similarity value for each pair of unfiltered normalized code segments as a function of the probabilistic hash signatures of the corresponding pair of unfiltered normalized code segments, wherein each similarity value is indicative of code similarity between the corresponding pair of unfiltered normalized code segments.

13. The one or more non-transitory, computer-readable storage media of claim 12, wherein to extract the first data element of each computer instruction comprises to extract a first byte of each computer instruction.

14. The one or more non-transitory, computer-readable storage media of claim 12, wherein each code segment of the plurality of code segments comprises a basic block.

15. The one or more non-transitory, computer-readable storage media of claim 12, wherein to determine the probabilistic hash signature for each normalized code segment using the n-gram analysis algorithm comprises, for each normalized code segment to:

clear all bits of a signature bit vector associated with the corresponding normalized code segment;

generate a plurality of n-grams as a function of the corresponding normalized code segment, using a sliding window of width n; and for each n-gram of the plurality of n-grams: (i) apply a hash function to the corresponding n-gram to generate a hash value, (ii) determine a bit index as a function of the hash value, and (iii) set a bit within the signature bit vector at the bit index.

16. The one or more non-transitory, computer-readable storage media of claim 12, wherein the one or more computer-readable storage media further comprises a plurality of instructions that in response to being executed cause the computing device to:

identify a second plurality of code segments within a collection of known-good software; and for each code segment of the second plurality of code segments, extract a first data element from each computer instruction of the code segment to generate a known-good normalized code segment within the plurality of known-good normalized code segments.

17. The one or more non-transitory, computer-readable storage media of claim 12, further comprising a plurality of instructions that in response to being executed cause the computing device to generate a graph including the similarity values, wherein to generate the graph including the similarity values comprises to:

create a node for each normalized code segment; and for each pair of unfiltered normalized code segments, create an edge between the nodes for the corresponding pair of unfiltered normalized code segments if the similarity value of the corresponding pair of unfiltered normalized code segments has a predefined relationship with a threshold similarity value.

18. The one or more non-transitory, computer-readable storage media of claim 12, wherein to determine the similarity value comprises to determine an approximate Jaccard index of the probabilistic hash signatures of each pair of unfiltered normalized code segments.

19. One or more non-transitory, computer-readable storage media comprising a plurality of instructions that in response to being executed cause a computing device to:

identify a plurality of code segments within a collection of software;

determine a probabilistic hash signature for each code segment using an n-gram analysis algorithm;

filter the plurality of code segments as a function of a plurality of known-good code segments to identify unfiltered code segments of the code segments, wherein to filter the plurality of code segments comprises to determine whether the probabilistic hash signature of the code segment is included in a filter bit vector generated as a function of the plurality of known-good code segments;

determine the filter bit vector as a function of the known-good code segments using the n-gram analysis algorithm; and determine a similarity value for each pair of unfiltered code segments as a function of the probabilistic hash signatures of the corresponding pair of unfiltered code segments, wherein each similarity value is indicative of code similarity between the corresponding pair of unfiltered code segments.

* * * * *